United States Patent
Foster

[11] 3,906,765
[45] Sept. 23, 1975

[54] NUMERICALLY CONTROLLED CONTOUR FORMING MACHINE

[75] Inventor: Gene B. Foster, Seattle, Wash.

[73] Assignee: The Boeing Company, Seattle, Wash.

[22] Filed: Nov. 20, 1974

[21] Appl. No.: 525,584

[52] U.S. Cl. ............................. 72/9; 72/17; 72/173
[51] Int. Cl.² ............................................ B21D 5/14
[58] Field of Search ......... 72/9, 10, 11, 12, 17, 170, 72/173

[56] References Cited
UNITED STATES PATENTS

| | | | |
|---|---|---|---|
| 3,352,136 | 11/1967 | Clarke | 72/9 |
| 3,568,637 | 3/1971 | Smith, Jr. | 72/8 |
| 3,854,215 | 12/1974 | Foster | 72/9 X |

Primary Examiner—Milton S. Mehr
Attorney, Agent, or Firm—Christensen, O'Connor, Garrison & Havelka

[57] ABSTRACT

A piece of material (part) having a preformed cross-sectional configuration is moved through a pair of pinch rolls located in between right and left hand forming rolls. Each forming roll is position adjustable both laterally and separationwise with respect to the pinch rolls along two longitudinal axes. In addition, each forming roll is rotationally adjustable along two rotational axes. As the part moves through the machine, the right and left hand forming rolls are positioned in accordance with a numerical program. The positioning is such that the piece of material is uniplanar or multiplanar contoured in a desired manner. As the contoured part exits from the machine, it passes through a uniplanar or a multiplanar sensor, which senses the contour of the part, including any springback occurring subsequent to roll forming. The sensed information is used to adaptively modify the control signals controlling the position of the right and left hand forming rolls. The signal output(s) of the uniplanar or multiplanar sensor is (are) integrated to improve its (their) stability. The integrated signal(s) are used to develop correction signals (k) for each controllable longitudinal or rotational axis in accordance with the following algorithm $$k = k_0 + \left[ \frac{q_0}{q_1} - 1 \right]$$

where: $k_0$ equals the preceding correction factor; $q_0$ equals the contour reference value computed from part geometry and supplied by the numerical control signal source; and, $q_1$ equals the contour measurement sensed by the sensor along the axis whose correction factor is being computed. The axis control signals are multiplied by the thusly developed axis correction signals to provide corrected axis control signals which are utilized to control the movement of the forming rolls along their respective longitudinal and rotational axes.

17 Claims, 21 Drawing Figures

3,906,765

NUMERICALLY CONTROLLED CONTOUR FORMING MACHINE

RELATIONSHIP TO OTHER APPLICATIONS

This application is related to U.S. Pat. application Ser. No. 383,374, filed July 27, 1973 by the inventor named herein and entitled "Multiplanar Sensor and Control System for use in Roll Forming Machines." As to common subject matter, the benefit of the filling date of that application is claimed herein.

BACKGROUND OF THE INVENTION

This invention is directed to numerically controlled machines and, more particularly, to machines directed to the contour forming of extruded and sheet metal parts.

Contour forming machines for forming contours in extruded and sheet metal structural elements or parts, such as body frames, stiffeners and stringers used in aircraft, for example, fall generally into two classes — stretch forming machines and contour rolling machines.

Stretch forming machines cause the parts to yield under tension while being maintained in a plastic state. The parts are wrapped against a form block of the desired contour until the desired part contour is achieved. Because an individual form block is required for each part, stretch forming has the disadvantage of requiring considerable lead time for form block fabrication and testing. With most high-strength materials, springback factors must be experimentally developed and incorporated into the form block contour. In addition to the expense attendant to developing individual form blocks, and the considerable lead time involved, stretch forming has the further disadvantage of requiring the maintenance and storage of an expensive inventory of large, fairly complex tools. Moreover, stretch forming has the mechanical disadvantage that when a part is formed in tension it has a strong tendency to thin and neck, thus losing structural strength. In order to avoid this tendency, filler blocks and a variety of elongation control devices are frequently employed, all of which further increase the cost of contour forming using this process.

In roll forming machines a part is traversed through an arrangement of rolls that are progressively offset to impart increasing contour. The operator of the roll forming machine continues to increase the contour of the part by adjustment of the rolls until he determines, through frequent reference to a template or checking fixture, that the desired contour configuration has been achieved. Because only a small increment of the part is formed at a time, and because the geometric arrangement of the rolls provides a considerable leverage factor, roll forming facilities are smaller than comparable stretch forming facilities. Moreover, roll forming machines are considerably less expensive than corresponding stretch forming machines. However, classically, only uniplanar contours, as opposed to multiplanar contours, have been formed using roll forming facilities. Moreover, in the past, it has been found that parts with complex cross-sections cannot be readily contour formed. Further, in the past, manual adjustment of roll position in accordance with an operator's experience has been required in order to form the resultant part and to compensate for varying amounts of springback. Because of the latter disadvantage, the time required to form a particular part and the resulting part quality depends to a large extent on the skill of the operator. Because operator skill is involved, part forming costs rapidly increase with critical tolerance requirements.

It will readily be appreciated from the foregoing discussion that stretch forming facilities are generally more suitable for large scale production because they require less operator skill, even though an expensive inventory of fairly complex tooling is required. On the other hand, roll forming facilities are better adapted to prototype development in special situations, even though labor costs are considerably higher due to the high degree of operator skill required. Obviously, it would be desirable to eliminate the operator skill required in roll forming facilities and utilize the cost advantages of such facilities for large scale production. One of the problems with utilizing roll forming facilities in this manner is that springback of the part occurs after it passes through the contour forming rolls; hence, those rolls cannot be merely numerically controlled in some manner. Rather, the control system must include the ability to compensate for springback. Because springback is relatively unpredictable, except within relatively large ranges, the control system must be relatively sophisticated in order to provide adequate compensation for springback. This invention is directed to providing such a system.

Therefore, it is an object of this invention to provide a numerically controlled contour forming machine.

It is a further object of this invention to provide a numerically controlled contour roll forming machine including a mechanism for modifying the control signals applied to such a machine to compensate for effects of springback.

It is another object of this invention to provide a numerically controlled contour forming machine that includes pinch rolls and forming rolls and an adaptive control mechanism for controlling the positioning of said forming rolls along a multitude of axes.

SUMMARY OF THE INVENTION

In accordance with principles of this invention, a numerically controlled contour forming machine with adaptive control is provided. A piece of material (part) to be contour formed is moved through a pair of pinch rolls located in between right and left hand forming rolls. As the part is moved through the machine, the right and left hand forming rolls are position adjusted in accordance with a numerical program. The adjustment of the forming rolls is such that the piece of material is uniplanar or multiplanar contoured in a desired manner. As the piece exits from the machine, it passes through a uniplanar or a multiplanar sensor, which senses its contour, including any springback occurring subsequent to roll forming. The sensed contour information is used to modify the numerical control signals controlling the position of the right and left hand forming rolls, as needed.

In accordance with other principles of this invention, a control signal source generates axis control signals and applies them to a control system. The control system also receives a rate signal related to the rate of movement of the part to be contour formed through the pinch rolls. Further, the control system receives an adaptive control signal from the uniplanar sensor (or a multitude of signals from the multiplanar sensor, if it is being used). In accordance with these signals, the control system controls the position and rate of position change of the right and left hand forming rolls about a multitude of axes.

In accordance with further principles of this invention, the right and left hand forming rolls are position adjustable both laterally and separationwise with respect to the pinch rolls. In addition, the right and left hand forming rolls are both rotatably adjustable: (1) about the axis representing the longitudinal part centerline when the forming rolls are aligned; and, (2) about axes that can be defined as being either parallel to the vertical centerline of the pinch rolls or an axis inclined thereto, the particular inclined axis being determined by the exact configuration of the forming rolls.

In accordance with still other principles of this invention, the control system modifies the adaptive control signal(s) created by the uniplanar (multiplanar) sensor(s) by first integrating that (those) signal(s). The integrated signals for each axis are manipulated in accordance with the alogrithm $$k = k_0 + \left[\frac{q_0}{q_1} - 1\right]$$

where:

$k_0$ equals the previous correction factor;

$q_0$ equals a contour reference value provided by the numerical control signal source; and, $q_1$ equals the contour measurement determined by the sensor, including springback.

In accordance with still further principles of this invention, each forming roll is rotatably mounted in a position adjustable yoke. The yokes are adapted to swivel about an axis running orthogonally through the centerline defined by the rotational axis of the related forming roll. In addition, each yoke has a semi-spherical outer surface that is position adjustable; further, each yoke is supported by a mechanism that allows it to be position adjusted along two orthogonal longitudinal axes.

In accordance with yet other principles of this invention, a rotating shoe assembly is provided for pressing the part to be contour formed tightly against the forming rolls. Further, the pinch rolls are position adjustable in a manner such that they can change the leg angularity of a part as it is being contour formed, if desired. Further, the sensors are supported by a mechanism that centers them to the left hand forming roll. The sensors include at least one linear variable differential transformer adapted to measure the curvature of the part immediately subsequent to its leaving the left hand forming roll. Further, lateral aligning mechanisms are included as part of the uniplanar sensor and are adapted to laterally align it with respect to the configuration of the part being formed so that an accurate adaptive control signal is generated.

It will be appreciated from the foregoing brief summary that the invention provides a numerically controlled contour forming machine. Specifically, the invention provides a numerically controlled roll forming machine that has the advantages of prior art manually operated roll forming machines without the disadvantages thereof. The invention achieves this desirable result because it, in essence, can be "programmed" and because its program signals can be modified to compensate for unpredictable errors. Thus, the invention has the ability to provide contour formed parts meeting very close tolerance specification. The invention provides this result without requiring undue operator skill of the type required by prior art manually controlled mechanisms of a similar nature. The invention will provide production products equal to or better than those formed using stretch forming techniques without requiring that an expensive inventory of parts be maintained. Thus, the invention overcomes the previously discussed disadvantages of both stretch and roll contour forming systems.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
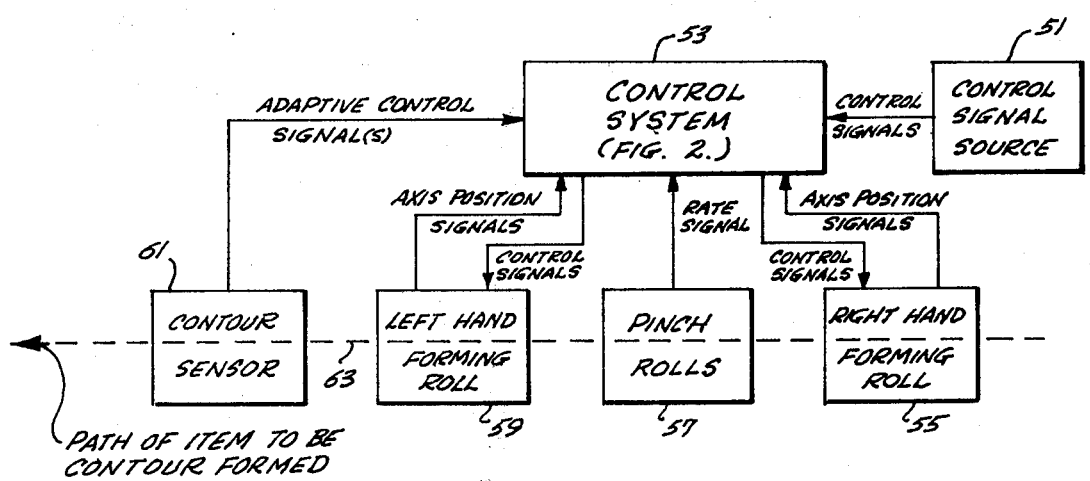
FIG. 1 is a block diagram illustrating a preferred embodiment of the invention.

FIG. 1 is a block diagram illustrating a numerically controlled contour forming machine formed in accordance with the invention and comprises: a control signal source 51; a control system 53; a right hand forming roll 55; pinch rolls 57; a left hand forming roll 59; and a contour sensor 61.

The control signal source 51 generates a plurality of control signals and applies them to the control system 53. The control signal source could, for example, be a reader for reading punched or magnetic tape. Alternatively, the control signal source could be a memory, which stores manually inserted control signals and outputs them as needed.

The control system 53 also receives: axis position signals related to the position of the right and left hand forming rolls with respect to zeroing points along each axis along which they can be positioned; and, a rate signal from the pinch rolls which designates the rate of movement of the part to be contour formed through the machine along the path of travel designated by dashed line 63. Further, the control system 53 receives adaptive control signals from the contour sensor 61. If the contour sensor is an uniplanar sensor, a single output signal is generated and utilized by the control system. Alternatively, if the sensor is a multiplanar sensor of the type described in U.S. Pat. application Ser. No. 383,374, filed July 27, 1973, by Gene B. Foster for "Multiplanar Sensor and Control System for Use in Roll Forming Machines," then a multitude of signals form the adaptive control signal. With respect to U.S. Pat. application Ser. No. 383,374, the information contained therein, particularly the information related to the illustrated and described multiplanar sensor, is incorporated herein by reference. Regardless of the type of sensor, the control system utilizes information sensed by the contour sensor to modify the control signals it applies to the right and left hand forming rolls 55 and 59.

Figure 2:
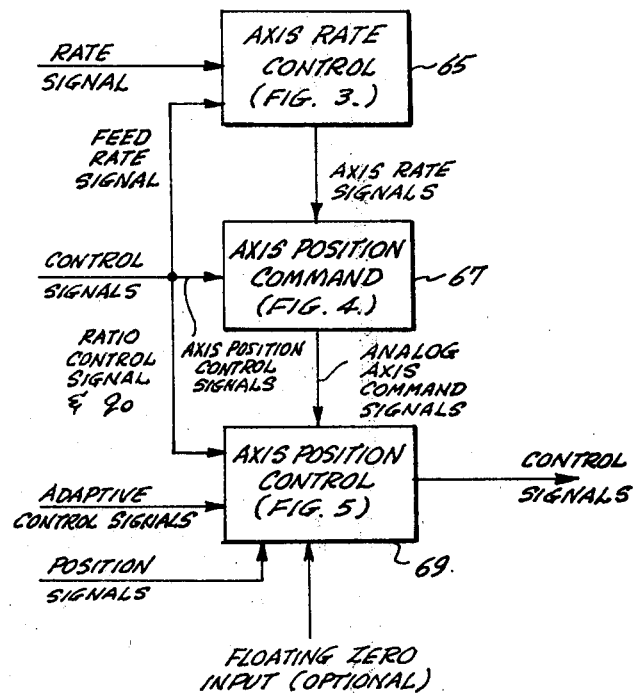
FIG. 2 is a block diagram of a control system suitable for use in the embodiment of the invention illustrated in FIG. 1.

FIG. 2 is a block diagram illustrating in somewhat more detail a control system suitable for use in the embodiment of the invention illustrated in FIG. 1 and comprises: an axis rate control 65; an axis position command 67; and an axis position control 69. The rate signal received from the pinch rollers 57, which may be generated by a shaft encoder, for example, is received by the axis rate control 65. In addition, the axis rate control receives a feed rate signal from the control signal source 51. In accordance therewith, the axis rate control applies axis rate signals to the axis position command 67. The axis rate signals control the rate of movement of the right and left hand forming rolls 55 and 59 along their various axes of movement in the manner herein described.

The axis position command 67, in addition to receiving the axis rate signals, also receives axis position control signals from the control signal source 51. In accordance therewith, the axis position command 67 generates analog axis command signals and applies them to the axis position control 69. The analog axis command signals are adapted to control the movement of the right and left hand forming rolls 55 and 59 along their various axes, subsequent to the analog axis command signals being modified by the axis position control 69.

The axis position control 69, in addition to receiving the analog axis command signals, also receives the adaptive control signal or signals generated by the contour sensor 61 and position signals generated by suitable sensors (e.g. potentiometers) positioned so as to sense the position of the right and left hand forming rolls along the various controlled axes hereinafter described. Further, the axis position control 69 receives a ratio control signal and a $q_0$ signal for each axis from the control signal source. The significance of the ratio control signal and the $q_0$ signal will be better understood from the following description of a preferred embodiment of the axis position control 69.

Figure 3:
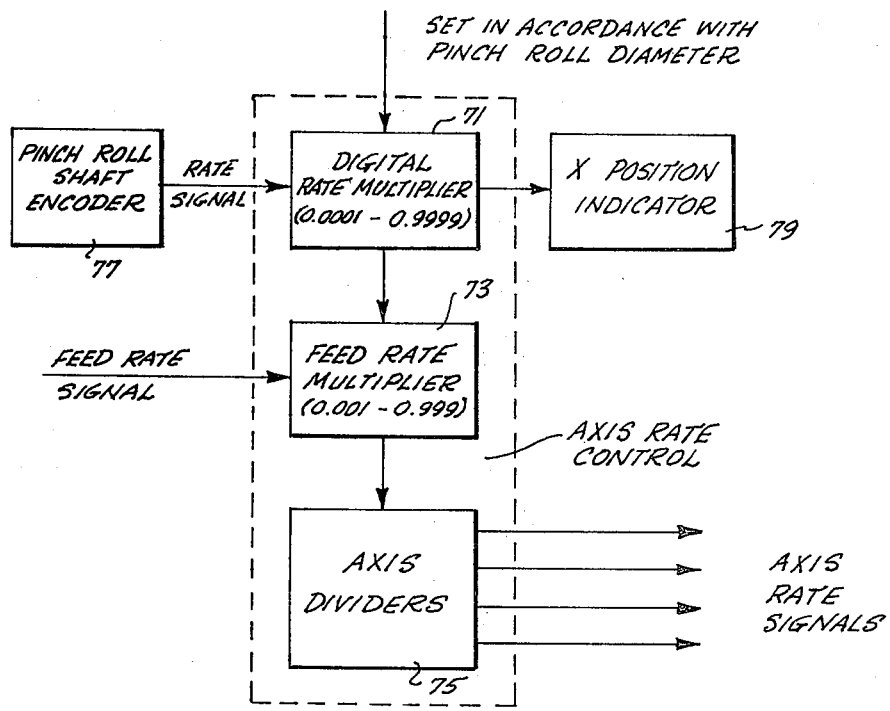
FIG. 3 is a block diagram of an axis rate control suitable for use in the control system illustrated in FIG. 2.
Figure 7:
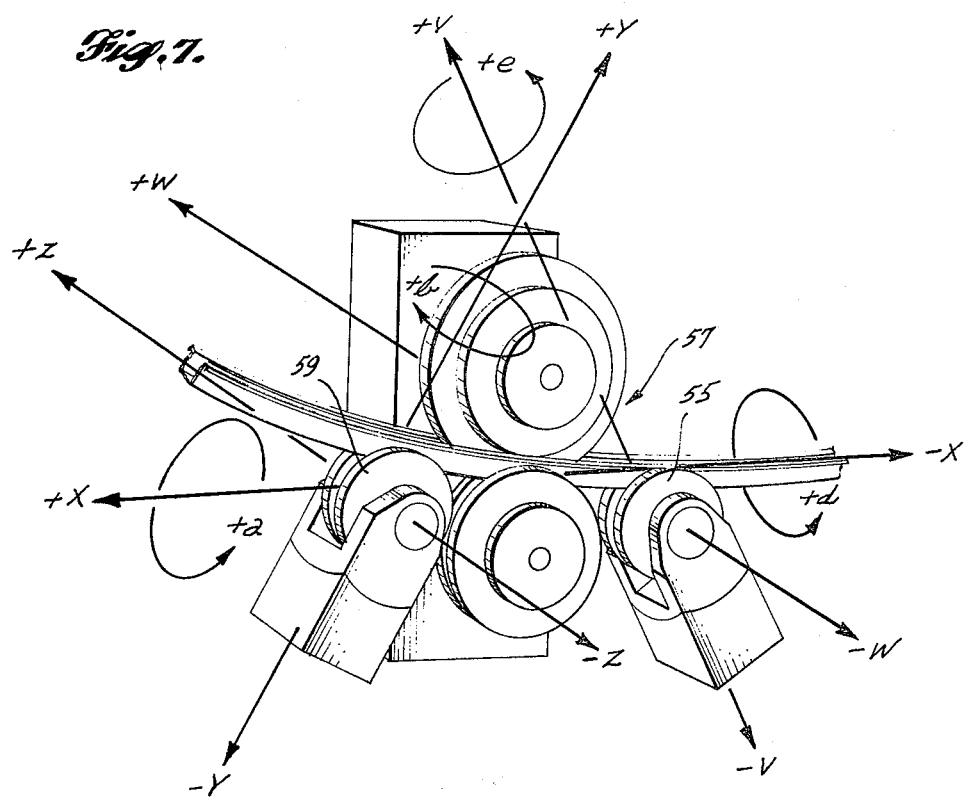
FIG. 7 is a schematic diagram illustrating the different movement axes of the right and left hand forming rolls.

FIG. 3 is a block diagram illustrating an axis rate control suitable for use in the control system illustrated in FIG. 2 and comprises: a digital rate multiplier 71; a feed rate multiplier 73; and axis dividers 75. In addition, FIG. 3 illustrates a pinch roll shaft encoder 77 adapted to generate the rate signal received by the axis rate control 65 and a position indicator 79 adapted to indicate the position of the part being contour formed as it moves through the contour forming mechanism of the invention. In this regard, as illustrated in FIG. 7 and more fully described hereinafter, the position of the part at any particular point in time is defined as its position along the X-axis, with the X-axis being defined as the longitudinal part centerline when the right and left hand forming rolls are aligned with the center of the pinch rolls.

As noted above, the pinch roll shaft encoder 77 generates a rate signal. The rate signal is applied to the digital rate multiplier 71 which is set in accordance with the diameter of the pinch rollers. Preferably, the rate of multiplication varies between 0.0001 and 0.9999, depending upon the specific diameter of the pinch rolls. The digital rate multiplier is preferably adjusted so that it outputs one pulse per 0.001 inch of part travel. This adjustment is determined from the following formula: $C = 1000\pi D/R$ where: C equals the calibration (multiplication) factor; D equals the diameter of the encoder related pinch roll in inches; and R equals the pulse rate of the pinch roll shaft encoder in pulses per second. Thus, if the encoder, for example, generates 36,000 pulses per revolution and the diameter of the pinch roll is 10.5 inches, the digital rate multiplier is set to multiply by a factor of 0.9163, assuming the maximum rate of revolution of the pinch rollers is 10 revolutions per minute.

The output of the digital rate multiplier is applied to the position indicator, which includes an accumulator for accumulating the number of pulses generated and a display for displaying the accumulated total. In addition, the digital rate multiplier output is applied to the feed rate multiplier 73.

The feed rate multiplier also receives a feed rate signal generated by the control signal source 51. The feed rate signal is, in effect, a limiting signal determined by the parameters of the N/C contour machine being controlled. More specifically, each such machine has certain limits on the rate at which its forming rolls can be moved along each axis of movement. Thus, depending on the desired contour, one axis sets the limit for all axes of movement. The feed rate signal forms an input that limits forming roll axis movement to this maximum value.

Thus, the feed rate multiplier reduces the output of the digital rate multiplier to a level such that it can be utilized through the axis dividers to move the right and left hand forming rolls along their various axes of movement in a manner such that the rolls reach the desired position along the various axes all at the same time and in the most rapid manner, which manner is generally controlled by the rate limit of one axis, the axis being determined by the particular part contour desired. preferably, the feed rate multiplier multiplies the output of the digital rate multiplier by a factor lying in the range of from 0.001 to 0.999.

The output of the feed rate multiplier is applied to the axis dividers 75 where it is divided either by a suitable chain of digital multipliers or by a plurality of separate dividers. In either case, the dividers may be either preset or controlled by the control signal source, as desired. The axis dividers 75 divide the digital output of the feed rate multiplier to levels suitable for controlling the rate of forming roll movement along each controlled axis. The axis rate signals are, as illustrated in FIG. 2 and noted above, applied to an axis position command, preferably formed of a plurality of circuits of the type illustrated in block form in FIG. 4.

At this point it will be appreciated that the axis rate control provides rate control signals that control the rate of movement of the right and left hand forming rolls along their various axes of movement so that coordinated movement occurs, whereby desired positions are simultaneously reached, and no time lag exists between the time one position is reached and other positions are reached.

Figure 4:
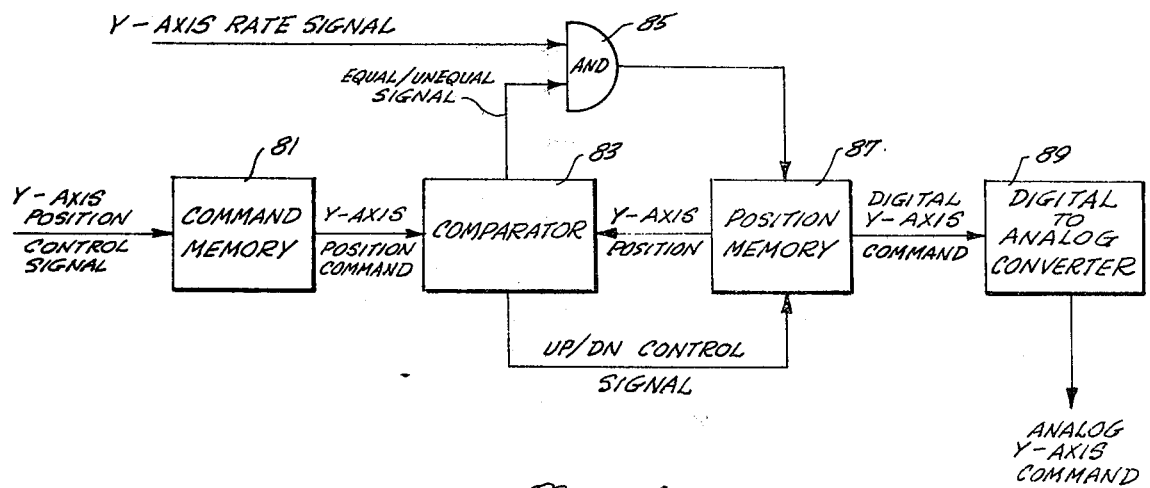
FIG. 4 is a block diagram of an axis position command suitable for use in the control system illustrated in FIG. 2.

FIG. 4 is a block diagram illustrating an axis position command circuit suitable for use in the control system illustrated in FIG. 2. It is pointed out here that, as noted above, an axis position command circuit of the type illustrated in FIG. 4 is needed for each axis to be controlled, whereas only a single axis rate control of the type illustrated in FIG. 3 is needed. For purposes of discussion only, the axis position command circuit is illustrated as adapted to control the Y-axis of movement, as that axis is hereinafter defined.

The position command 67 illustrated in FIg. 4 comprises: a command memory 81; a comparator 83; an AND gate 85; a position memory 87; and, a digital-to-analog converter 89. The manner such that the rolls reach the desired position along the various axes all at the same time and in the most rapid manner, which manner is generally controlled by the rate limit of one axis, the axis being determined by the particular part contour desired. Preferably, the feed rate multiplier multiplies the output of the digital rate multiplier by a factor lying in the range of from 0.001 to 0.999.

The output of the feed rate multiplier is applied to the axis dividers 75 where it is divided either by a suitable chain of digital multipliers or by a plurality of separate dividers. In either case, the dividers may be either preset or controlled by the control signal source, as desired. The axis dividers 75 divide the digital output of the feed rate multiplier to levels suitable for controlling the rate of forming roll movement along each controlled axis. The axis rate signals are, as illustrated in FIG. 2 and noted above, applied to an axis position command, preferably formed of a plurality of circuits of the type illustrated in block form in FIG. 4.

At this point it will be appreciated that the axis rate control provides rate control signals that control the rate of movement of the right and left hand forming rolls along their various axes of movement so that coordinated movement occurs, whereby desired positions are simultaneously reached, and no time lag exists between the time one position is reached and other positions are reached.

FIG. 4 is a block diagram illustrating an axis position command circuit suitable for use in the control system illustrated in FIG. 2. It is pointed out here that, as noted above, an axis position command circuit of the type illustrated in FIG. 4 is needed for each axis to be controlled, whereas only a single axis rate control of the type illustrated in FIG. 3 is needed. For purposes of discussion only, the axis position command circuit is illustrated as adapted to control the Y-axis of movement, as that axis is hereinafter defined.

The position command 67 illustrated in FIG. 4 compares: a command memory 81, a comparator 83; and AND gate 85; a position memory 87; and, a digital-to-analog converter 89. The Y-axis rate signal output of the axis divider 75 is applied to one input of the AND gate 85. In addition, the Y-axis position control signal, generated by the control signal source 51, is applied to the command memory 81. More specifically, in accordance with the invention control signal blocks are sequentially generated by the control signal source on an intermittent basis using well known digital data processing equipment. The data contained in these control signal blocks is first entered into a suitable buffer memory (not shown). As the information contained in each control signal block is needed, the data is transferred from the buffer memory to the command memory, utilizing a timing system not illustrated for purposes of clarity. The data contained in the command memory represents a Y-axis position command.

The comparator compares each new Y-axis position command stored in memory with the actual Y-axis position as recorded in the position memory 87. If the commanded and actual positions are unequal, the comparator originates two signals. One signal is an UP/DN control signal and is applied to the position memory to indicate the direction in which the position of the forming roll along the Y-axis is to change, i.e. up or down with respect to the position memory. It is pointed out here that the position memory is a pre-programed memory wherein each programed memory position designates a Y-axis position. The position memory could for example be a solid state read only memory (ROM).

The second output of the comparator is an equal-/unequal signal and is applied to the second input of the AND gate 85. When the comparator determines that the position command and position signals are unequal this output enables the AND gate 85. An equal determination disables the AND gate. When enabled, the AND gate passes the Y-axis rate signal, which is a pulse train. This pulse train causes the position memory to move "up" or "down" as directed by UP/DN control signal, i.e., the position memory is searched at the Y-axis rate signal pulse rate and in a direction determined by the result of the comparison. As the position memory is searched, it outputs a series of Y-axis digital commands. These digital commands are received by the digital-to-analog converter 89 and converted to analog Y-axis commands. The analog Y-axis commands are applied to an axis position control 69 of the type illustrated in FIG. 5 and hereinafter described.

In summary, it will be appreciated from viewing FIG. 4 and the foregoing description that as long as the related forming roll is positioned at the correct point along the related axis, the comparator will generate an "equal" output and no up/down control signal. Thus the AND gate 85 will not be enabled. When the forming roll position along the appropriate axis is to be changed, an unequal output, which enables the AND gate 85, is generated. If the new position is "up" from the present position, an "up" control signal is applied to the position memory 87. Alternatively, if the new position is "down" from the previous position, a "down" control signal is applied to the position memory 89. Since the AND gate 85 is enabled, the Y-axis rate pulses are also applied to the position memory 87. In accordance with the Y-axis rate signal pulse rate, the position memory generates Y-axis digital commands. The digital commands, in turn, create analog Y-axis commands adapted to cause movement of the appropriate forming roll along the appropriate axis. Prior to such movement, however, the analog Y-axis commands are modified, as necessary, in the manner hereinafter described.

Figure 5:
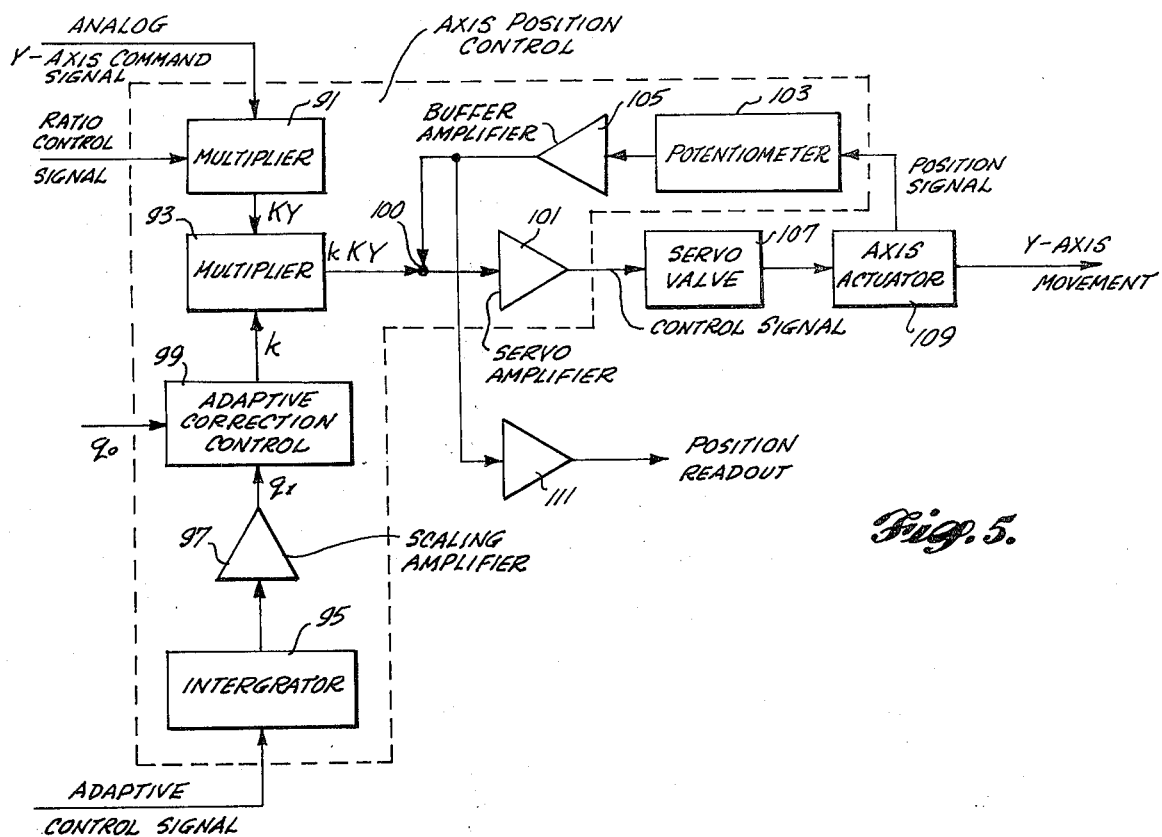
FIG. 5 is a block diagram of an axis position control suitable for use in the control system illustrated in FIG. 2.

FIG. 5 is a block diagram illustrating an axis position control suitable for use in the control system illustrated in FIG. 2. As with the axis position command 67, an axis position control 69 is needed for each axis to be controlled. The axis position control 69 illustrated in FIG. 5 comprises: a first multiplier 91; a second multiplier 93; an integrator 95; a scaling amplifier 97; an adaptive correction control 99; a servo amplifier 101; a potentiometer 103; and, a buffer amplifier 105. FIG. 5 also includes a servo valve 107 and an axis actuator 109; and, a position readout amplifier 111.

The analog Y-axis command signal is applied to one input of the first multiplier 91. A ratio control signal related to the Y-axis is applied to the second input of the multiplier 91. The ratio control signal is generated by the control signal source 51. The ratio control signal increases the gain in the axis loop (the Y-axis loop in the illustrated circuit) by an infinitely variable factor lying within a predetermined range, from one to three, for example. The ratio control signal provides for rough springback control by causing the part to be overbent. More specifically, the analog axis command represents a desired contour. Most parts, when contour formed, will "springback" to some degree after they exit from the last forming roll. The amount of springback can be predicted, within a broad range, depending on the nature of the material and the radius of the contour along the axis being controlled. The ratio control signal is a multiplication value that compensates for springback within the predictable range. Fine or vernier springback compensation is provided by the adaptive control portion of the axis position control in the manner hereinafter described. The output of the first multiplier 91 is designated KY and is applied to one input of the second multiplier 93.

The adaptive control signal related to the controlled (Y) axis is applied to the input of the intergrator 95. The integrator is a variable step integrator that prevents sensed contour variations generated by extraneous sources from affecting the system, thereby improving system stability. The integrator achieves this result by averaging sensed contour values over selectable part increments, rather than supplying instantaneous readings reflecting all minor inconsistencies in the part.

The output of the integrator 95 is amplified by the scaling amplifier 97 and applied to one input of the adaptive correction control 99. This input is designated $q_1$. The adaptive correction control receives a second input designated $q_0$. $q_0$ is a contour reference value signal generated by the control signal source 51. This signal is calculated from desired part geometry and designates what the expected output of the sensor should be at any particular point in time. The adaptive correction control computes an output signal designated k in accordance with tje algorithm:

$$k = k_0 + \left[\frac{q_0}{q_1} - 1\right]$$

wherein $q_0$ and $q_1$ are as indicated above, and $k_0$ equals the initial or preceding correction factor. Thus, the adaptive correction control 99 includes a memory which stores and continuously generates a correction factor signal, said signal being changed each time a change in the correction factor is calculated.

Obviously, contour reference values ($q_0$) provided by the control signal source 51 are offset by an increment equal to the transport delay in the system, i.e., the time required for the contoured part to reach the contour sensor 61. Thus, the contour reference values ($q_0$) come on line at the time the corresponding part increment reaches the sensor and is measured.

Initially, the adaptive correction control computes the $q_0/q_1$ ratio. If no previous correction factor is recorded in its memory, $q_0/q_1$ is used as the initial correction. If a $k_0$ is present in memory, $$\left[\frac{q_0}{q_1} - 1\right]$$

is added to $k_0$ in accordance with the above algorithm. The new correction factor, $k$, is applied to the next block of active commands as a multiplication factor. More specifically, the second multiplier 93 multiplies KY by $k$ to produce a Y-axis command output designated kKY. Obviously, a $k$ having a value larger than unity increases KY while a $k$ having a value smaller than unity decreases KY. The adaptive correction control 99 continues to calculate new $k$ values until $q_0$ equals $q_1$. When this condition occurs the desired part contour is being created. The last value of $k$ is retained as the appropriate factor for the remaining part length, and for succeeding parts (if recorded for future use), unless subsequent changes in contour require the development of a new $k$ value.

Figure 6:
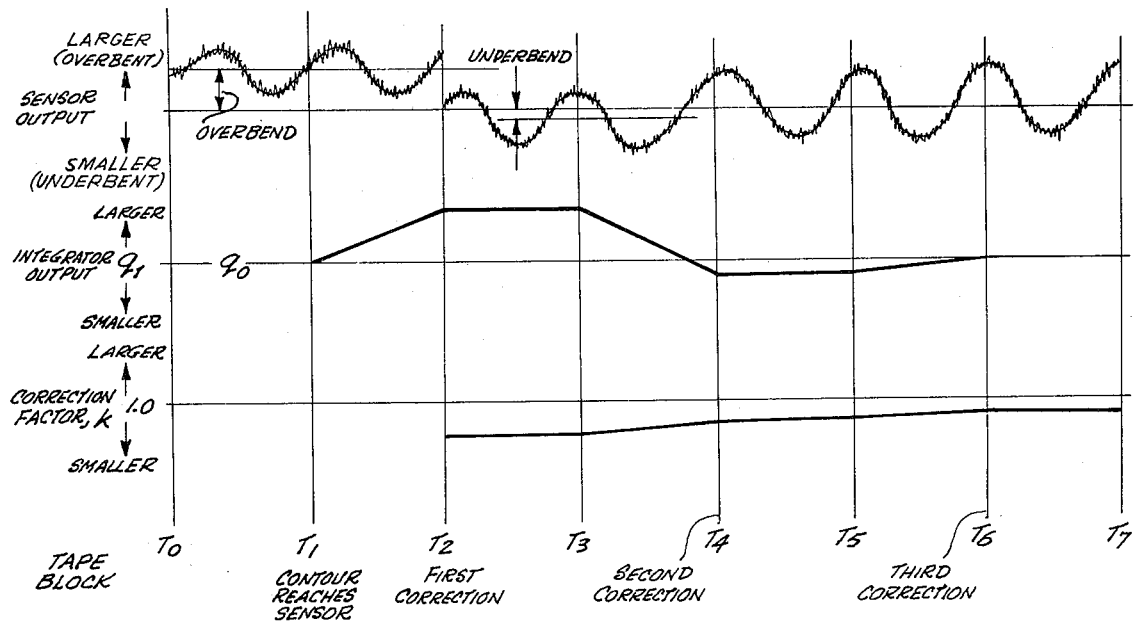
FIG. 6 is a waveform diagram utilized to describe the operation of the adaptive correction control mechanism.

FIG. 6 illustrates the operation of the adaptive correction control 99 through a three-step sequence of operation. The first line of FIG. 6 illustrates the output of the sensor along the axis of interest; the second line illustrates the output of the integrator ($q_1$); and, the third line illustrates the correction factor ($k$). During the initial time interval $\Delta T$ (from $T_0$ to $T_1$), the output of the sensor relating the contoured portion of the part has not reached the sensor. Therefor there is no sensor output. During this period $q_1$ equals zero. Between $T_1$ and $T_2$ a contoured area of the part reaches the sensor and the integrator generates a ramp output relating to the overbend condition of the part, and the first correction factor is calculated. At $T_2$, a correction factor $k$ is applied to the second multiplier 93 and causes a slight underbend. Between $T_2$ and $T_3$ overbent material is still being sensed and no change in k occurs. At $T_3$ underbent material reaches the sensor and between $T_3$ and $T_4$ this new trend is integrated and a new $k$ created to correct in the opposite direction. At $T_4$ the new $k$ is applied to the multiplier 93; however, the new $k$ is somewhat inadequate. Between $T_5$ and $T_6$ another new $k$ is calculated and applied. At $T_7$, $q_0 = q_1$ and the last calculated $k$ continues to be generated, unless subsequent contour or material changes cause an underbend or overbend condition to develop. If such a condition does develop, the cycle is repeated and a new $k$ is calculated.

While not illustrated, preferably, an adaptive control range limiter is incorporated in the system illustrated in FIG. 5 to prevent unusually large extraneous signal variations from causing an erroneous $k$ to be calculated. The range limiter is connected in series with the integrator and set to limit the sensor signal to some level. In this manner any spikes created by large sporadic contour errors are ignored.

The output of the second multiplier ($kKY$) is applied to one input of a summing junction 100. The output of the summing junction 100 is connected to the input of the servo amplifier 101. The output of the servo amplifier 101 is applied to the servo valve 107. The servo valve 107 operates a hydraulic axis actuator 109. The hydraulic axis actuator 109 in turn causes Y-axis movement. In addition, the hydraulic axis actuator 109 controls the position of the movable element of the potentiometer 103. Thus, the potentiometer acts as an axis position indicator.

The output of the potentiometer, which is related to the position of the axis actuator which in turn is related to the position of the related forming roll along the Y-axis, is applied to input of the buffer amplifier 105. The output of the buffer amplifier 105 is connected to the second input of the summing amplifier 100 and to the input of the position amplifier 111. The output of the position amplifier 111 is a position readout signal and is applied to a suitable position readout display (not shown).

It will be appreciated by those skilled in the art and others that the axis position control illustrated in FIG. 5 is a closed loop servo system. The summing junction 100 compares the kKY signal with the output of the potentiometer which represents the actual position of the forming roll along the axis being commanded, in this case the Y-axis. The corrected analog Y-axis command ($kKY$) may vary, for example, from 0 to +10 volts, and the potentiometer output may vary from 0 to −10 volts. When these signals are unequal in absolute value, an error signal equal to the difference between the two voltages is produced. The polarity of the error signal is related to the direction that the axis actuator must move to drive the error signal to zero.

The servo amplifier 101 receives the error signal and outputs a current proportional to the error. This current is transmitted to the torque motor of the servo valve, causing the spool thereof to shift in accordance with the current level and polarity, as is well known in the N/C machine tool art. As the servo valve changes position, hydraulic fluid causes axis actuator movement. The potentiometer monitors the position of the forming roll along the Y-axis as it is changed by the axis actuator. The potentiometer signal is continuously fed back to the summing junction where it is compared to the corrected Y-axis analog command ($kKY$). As the controlled (Y) axis approaches the desired forming roll position, the error signal drops toward zero and the current level applied to the servo valve of the torque motor reduces causing the valve spool to shift toward its center (closed) position. When the sensed axis position becomes equal to the desired position, the summing junction input voltages are of equal value, but opposite in polarity. Thus, the output of the summing junction 100 is zero. Because this output is zero, the servo valve is nulled and axis motion stopped. The servo loop maintains the forming roll in this axis position until such time as a new block of position control signals commands a position change. Maintaining of the forming roll axis position is accomplished, preferably, by metering small amounts of fluid to the actuator as required to compensate for leakage and any mechanical deflection that occurs.

The description thus far has described an electronic control system for controlling the movement of the forming rolls of a contour roll forming machine along various axes. FIG. 7 illustrates schematically the various axes which can be controlled, if desired. Obviously, in some environments only one or two of these axes will be controlled, as opposed to the eight that are illustrated.

As noted above, the X-axis is the main reference axis and is defined as the axis along which the part centerline moves when the right and left hand forming rolls are aligned with the pinch rolls. In addition to this axis FIG. 7 illustrates four forming roll axes of motion for each of the forming rolls. These eight axes are defined as follows:

LEFT HAND FORMING ROLL

Y-axis -- vertical movement of the left hand forming roll along a line either parallel to the vertical centerline between the pinch rolls or inclined thereto (the axis is illustrated as inclined).

Z-axis -- lateral movement of the left hand forming roll with respect to the pinch rolls.

$a$-axis -- rotation of the left hand forming roll about the part centerline.

$b$-axis -- rotation of the left hand forming roll about the Y-axis or about a vertical axis normal to the X-axis (the axis is illustrated as rotation about the Y-axis).

RIGHT HAND FORMING ROLL

V-axis -- vertical movement of the right hand forming roll along a line either parallel to the vertical centerline of the pinch rolls or inclined thereto (the axis is illustrated as inclined).

W-axis -- lateral movement of the right hand forming roll with respect to the pinch rolls.

$d$-axis -- rotation of the right hand forming roll about the part centerline.

$e$-axis -- rotation of the right hand forming roll about the V-axis or about a vertical axis normal to the X-axis (the axis is illustrated as rotation about the V-axis).

Obviously, in the most advanced configuration of the invention, mechanical power is used to control forming roll movement about each of the axes described above.

Mechanical power may be provided by hydraulic actuators of the type described above and schematically illustrated in FIG. 5, or it may be provided by electrical stepping motors, or other suitable devices. In either case, the power sources are, preferably, under closed loop control to insure accurate positioning of the forming roll about the related axis.

Depending on the size, shape and accuracy requirements of the part to be contour formed, it is possible to eliminate one or more of the axes of motion on one or more of the forming rolls. Further, in some instances, it is desirable to leave the b and e axes unpowered -- for example, when the parts to be contour formed are of sufficient thickness to cause a caster-like rotation along these axes to the least energy position during the rolling operation. Unpowered movement along the b and e axes is enhanced by the use of low friction arrangements (e.g. thrust or air bearings) located at a suitable interface. Thus, it is desirable to include such arrangements in an actual embodiment of the invention.

Movement along the linear right and left hand roll forming axes (Y, Z, V, W) is, preferably, readily accomplished using conventional slide and gibbed way arrangements. Contrawise, each pair of rotation axes (a and b, d and e) require an arrangement that provides two degrees of freedom about a common point. A suitable mechanism for allowing movement along all illustrated axes of either the right or the left hand forming roll is illustrated in FIGS. 9–12, and hereinafter described. Prior thereto, however, it should be noted that the rotational axes of each forming roll must lay in a plane passing through the longitudinal part centerline normal to a horizontal reference plane containing the centerlines of the lower pinch roll and the forming roll shafts when the rolls are aligned. For ease of control system programming, the intersection between the two axes should be coincident with the normal location of the part centroid, as illustrated in FIG. 8 and now described.

Figure 8:
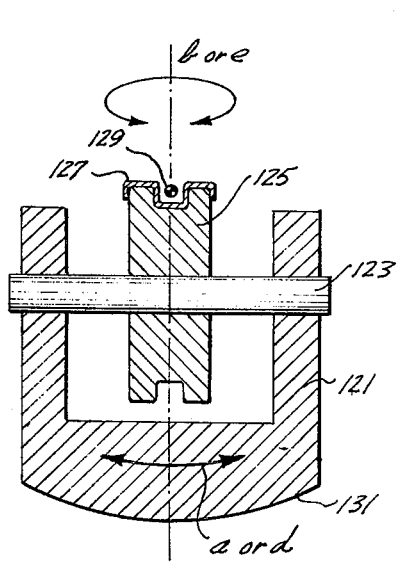
FIG. 8 is a schematic diagram illustrating the orientation of the rotary axes of movement of the forming rolls.

FIG. 8 illustrates schematically a yoke 121. Mounted between the legs of the yoke 121 is a shaft 123. Rotatably mounted on the shaft 123 is a forming roll 125. (Alternatively, the shaft 123 may be mounted for rotation in the yoke 121). In addition, a part to be formed 127 is illustrated in FIG. 8. The particular part to be formed as illustrated as a return flange hat. A return flange hat has a part centroid 129 located between the sides of its U-shaped center section. The b or e axis is formed about the bisecting axis (Y or V) running through the forming roll 125 and the a or d axis is coincident with the part centroid. The desired movement along the a or d axis, is achieved by making the outer surface 131 of the cross member of the yoke 121 semispherical and, as illustrated in FIG. 9, support it in a structure which allows movement about the part centroid at the location where it intersects the Y or V axis, as the case may be.

Figure 9:
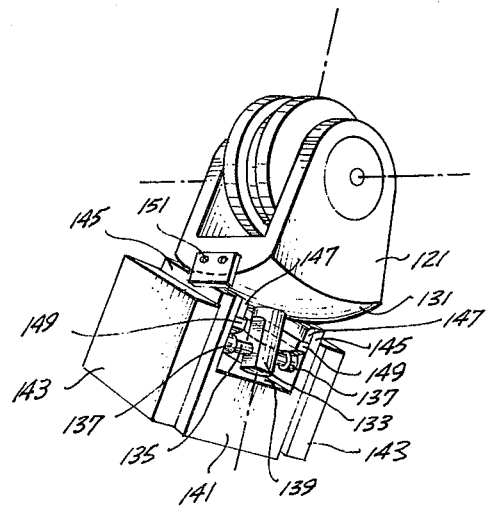
FIG. 9 is an isometric diagram illustrating schematically the mechanism for positioning one of the forming rolls.

FIG. 9 is a pictorial diagram illustrating the yoke 121 and its semi-spherical outer surface 131 mounted in a structure which allows movement about the part centroid at the point where it intersects the Y or V axis. Located in the center of the semi-spherical surface 131, and projecting radially outwardly therefrom, is a swivel post 133. The spherical surface is attached to the swivel post 133 in a rotatable manner whereby the yoke 121 is rotatable about Y or V axis, i.e. in the path of travel defined by the b or e axis.

A shaft 135 projects orthogonally outwardly from the swivel post, on either side thereof, and supports a pair of roller cams 137 at its outer ends. The swivel post 133 and roller cams 137 are located in an aperture 139 formed in a block 141 that is movable along the W or Z axis. The block 141 is in turn supported between a pair of arms 143 movable along the V or Y axes. (It will be appreciated from the following description of FIGS. 10–12 that the block 141 and the arms 143 are merely block illustrations of the mechanism for moving the associated roller along the described axes.)

The aperture 139 in the block 141 is defined by a pair of upwardly projecting legs 145. Affixed near the tops of the inner surfaces of the upwardly projecting legs 145 are semi-spherical support elements 147. The upper surfaces of the semi-spherical support elements 147 have radii of curvature equal to the radius of curvature of the semi-spherical surface 131 of the yoke 121, and mate therewith. Located immediately beneath the semi-spherical support elements 147 are curved ways 149. The cam rollers roll on (follow) the curved ways, which have a radius of curvature equal to the radius of curvature of the semi-spherical surface 131, plus the distance separating the curved ways from the semi-spherical surfaces of the semi-spherical support elements 147. Thus, as the cam rollers follow the curvature of the curved ways 149, they cause the yoke 121 to move about its spherical surface along rotational axis a or d. In this manner, the mechanism illustrated in FIG. 9 allows movement along the two rotational axes associated with either the right hand or the left hand forming roll. In some contouring situations, movement along the b or e axis may not be desired. A stop plate 151 adapted to be affixed to the yoke 121 so as to interact with the outer surface of one of the legs 145 is provided to achieve this result. The stop plate 151 prevents yoke rotation about the swivel post 133.

Figure 10:
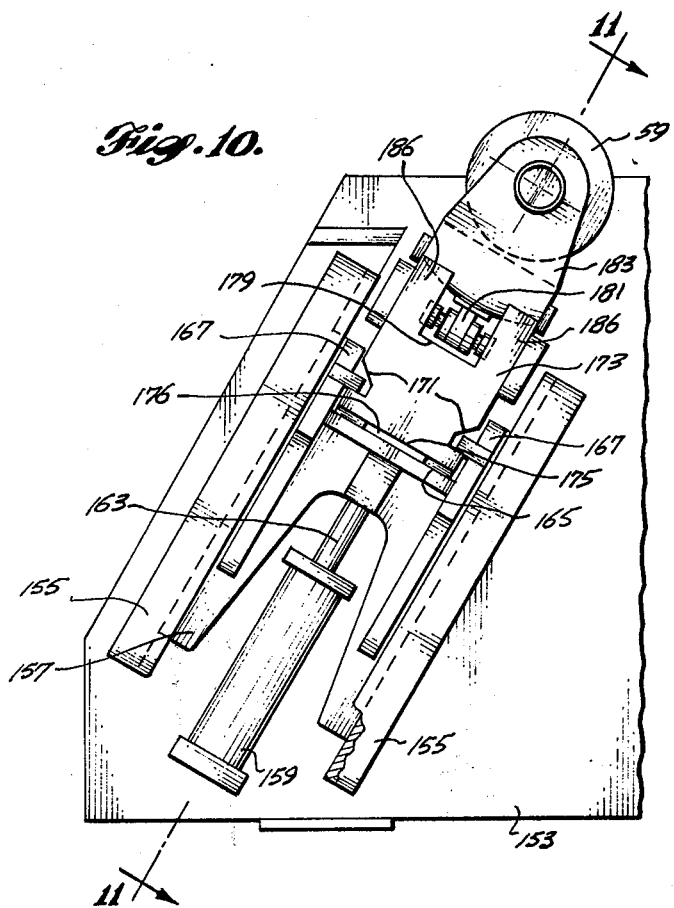
FIG. 10 is a front view illustrating a mechanism for positioning the left hand forming roll.
Figure 12:
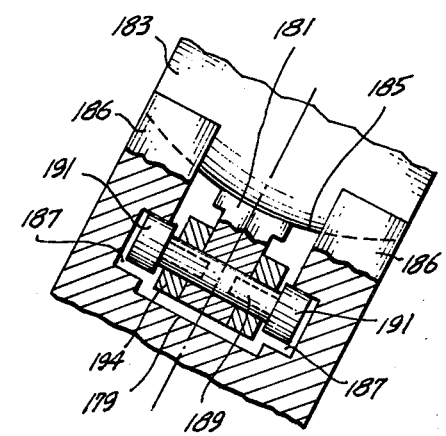
FIG. 12 is a fragmentary cross-sectional view along line 12—12 of FIG. 11.
Figure 11:
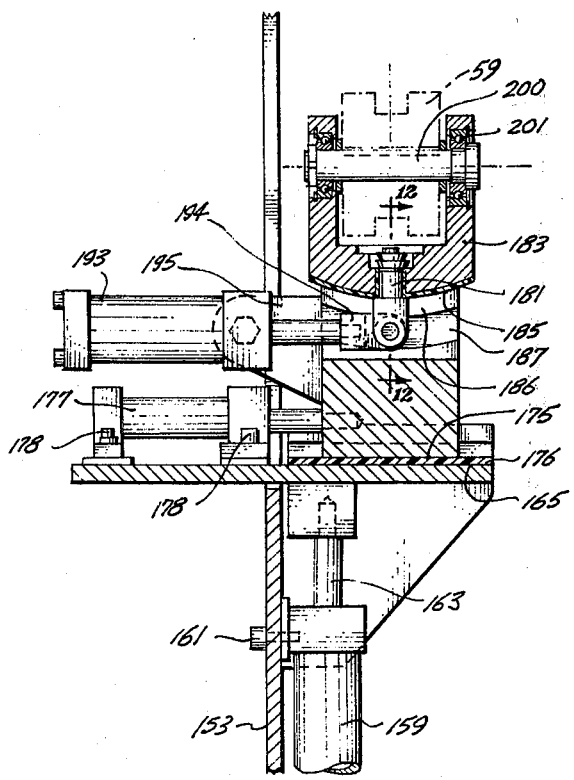
FIG. 11 is a cross-sectional view along line 11—11 of FIG. 10.

FIGS. 10–12 illustrate, in somewhat more detail, a powered mechanism suitable for moving the left hand forming roll about the Y, Z and a axes. While the b axis is unpowered, i.e. left free to rotate, it will be appreciated that a suitable power mechanism may be added, if desired. It also will be appreciated that a similar mechanism can be utilized to control the movement of the right hand forming roll.

FIGS. 10 and 11 illustrate a support plate 153. A pair of L-shaped supports 155 are mounted on the support plate 153 and lie along axes parallel to the Y axis. The L-shaped supports are mounted such that they, in combination with the support plate 153, define a pair of channels that face one another. A Y-axis support block 157 is located between the L-shaped supports and includes outer projections which lie in the channels they define. A first hydraulic actuator 159 also lies between the L-shaped supports 155, generally along an axis parallel to or coincident with the Y-axis. The first hydraulic actuator is attached to the support plate 153 by bolts 161. The outer end of the shaft 163 of the first hydraulic actuator 159 is attached to the Y-axis support block 157.

It will be appreciated from the foregoing description that the first hydraulic actuator 159 is adapted to move the Y-axis support block 157 in either direction along an axis parallel to or coincident with the Y-axis. As will be better understood from the following description, this movement moves the left hand forming roll along the Y-axis, since it is at all times defined as lying on that axis. Lateral alignment of the Y-axis support block is provided by the outer projections of the Y-shaped support blocks 157 and their associated channels.

The Y-axis support block 157 includes a generally flat surface 165 lying in a plane orthogonal to the Y-axis. Projecting upwardly on either side of the flat surface 165 in parallel planes lying parallel to the Y-axes, are gibbed arms 167. The gibbed arms 167 coact with ways 171 formed in a Z-axis support block 173. The Z-axis support block 173 includes a generally flat surface 175 that is spaced from the generally flat surface 165 of the Y-axis support block 157 by a spacer 176. The location of the gibbed arms 167 and the flat surfaces is such that the Z-axis support block 173 is orthogonally movable with respect to the Y-axis i.e., in the planes defined by the flat surfaces. Thus, the Z-axis support block is movable along an axis parallel to, or coincident with, the Z-axis.

Affixed by bolts 178 to the generally flat surface 165 of the Y-axis support block is a second hydraulic actuator 177. The shaft of the second hydraulic actuator 177 has its outer end affixed to the Z-axis support block 173, and is movable along an axis parallel to the Z-axis. Thus, when the second hydraulic actuator 177 is actuated, it moves the Z-axis support block 173 orthogonally with respect to the Y-axis support block 157 and along an axis parallel to, or coicident with, the Z-axis.

The upper end of the Z-axis support block 173 is generally U-shaped in cross-section (in a plane orthogonal to the Z-axis) and, thus, includes an aperture 179 best seen in FIG. 12. A swivel post 181 affixed to a yoke 183 to which the left hand forming roll 59 is rotatably attached lies in the aperture 179. The yoke 183 includes a spherical lower surface 185. The upper surfaces of the side walls 186 that define the aperture 179 are spherically formed and mate with the spherical lower surface 185 of the yoke. In addition, formed in the side walls 186 that define the aperture 179 are facing curved ways 187. As with FIG. 9, the curved ways have a radius of curvature equal to the radius of curvature of the spherical surface 185 of the yoke 183, plus the distance separating them from that surface. Affixed to the swivel post 181 is an orthogonally arrayed shaft 189 that supports cam rollers 191 on either end. The cam rollers lie in the curved ways 187. It will be appreciated that the yoke 183 is rotatable about two axes in the same manner as the yoke 121 illustrated in FIG. 9 and described above was rotatable about two axes. Since the manner of movement is the same, it will not be reiterated here. However, powered rotation about the a-axis is hereinafter described.

Powered movement about the a-axis is provided by a third hydraulic actuator 193 affixed to a flange 195 projecting outwardly from one of the side walls 186 that define the aperture 179. The outer end of the shaft 197 of the third hydraulic actuator 193 is rotatbly affixed by a yoke 194 to the shaft 189 to which the swivel pin 181 is affixed rotatably. Movement of the shaft 197 of the third hydraulic actuator 193 causes the cam rollers 191 to move in the curved ways 187. This movement causes rotary movement of the yoke 181 about the X-axis. Thus, the left hand forming roll 59 is moved along the a-axis. FIG. 11 also illustrates that the left hand forming roll 59 is mounted on a shaft 200 that is supported by bearings 201 mounted in the arms of the yoke 181. The bearings allow the left hand forming roll to freely rotate with respect to the yoke 181.

It will be appreciated from the foregoing description that a mechanism suitable for providing powered movement of the left hand forming roll along the Y, Z and a axes is provided. Movement along the b-axis is unpowered; however, the left hand forming roll is free to move along this axis, unless prevented from doing so by a suitable mechanism such as a locking plate 151 (FIG. 9). As noted above, a similar mechanism can be utilized to provide powered movement of the right hand forming roll about the V, W and d axes, with free movement along the e-axis, if desired. In addition, if desired, a hydraulic actuator (or other mechanical mechanism) can be included to provide powered movement along the b or e axes. In addition, while hydraulic actuators have been illustrated in FIGS. 10–12, and described above, obviously other mechanisms can also be utilized. For example, electric stepping motors can be utilized, if desired. Hence, the illustrated mechanism should be considered as illustrative only, not limiting.

Figure 13:
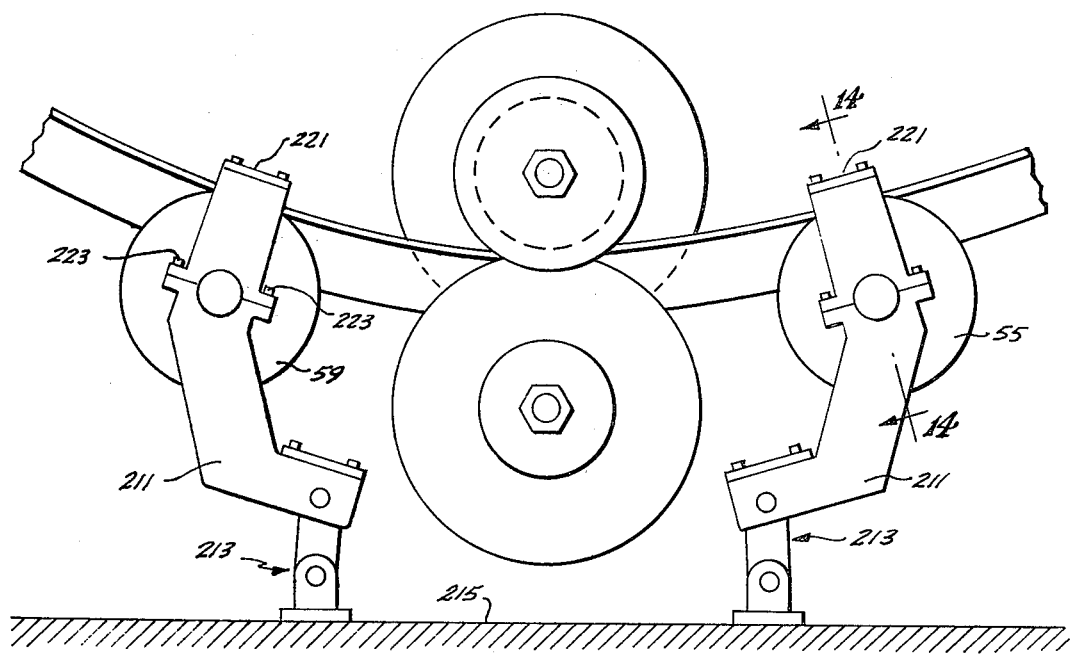
FIG. 13 is a schematic diagram illustrating a shoe assembly adapted to press the part to be formed tightly against the forming rolls.
Figure 14:
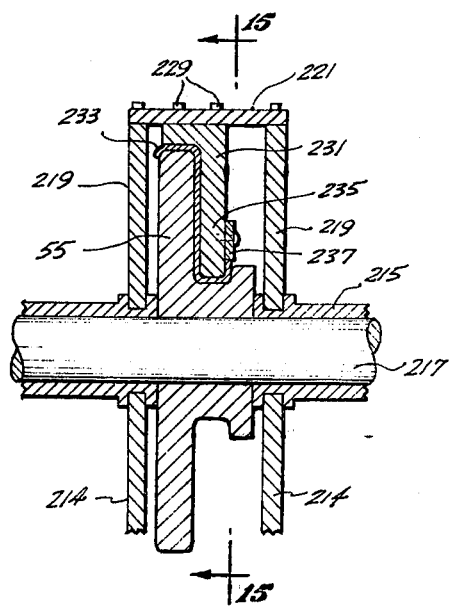
FIG. 14 is a cross-sectional view along line 13—13 of FIG. 13.
Figure 15:
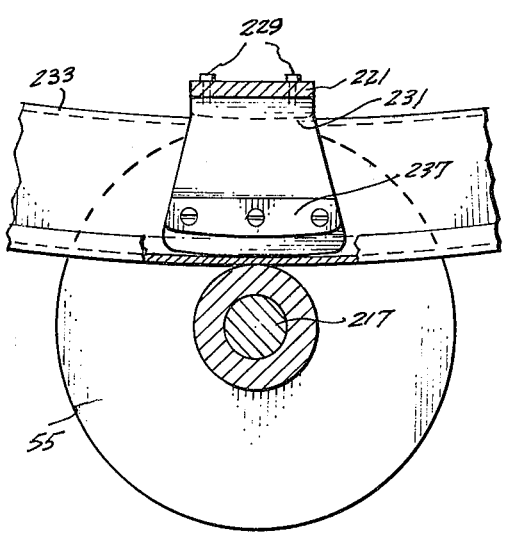
FIG. 15 is a cross-sectional view along line 15—15 of FIG. 14.

It has been found that some parts will move away from the forming rolls under the bending forces applied during severe twist or bow contour forming. Obviously, such separation will result in an unacceptable product being formed, because it allows uncontrollable part distortions to occur. The invention, however, provides a mechanism that is adapted to prevent such separations from occurring. This mechanism is illustrated in FIGS. 13–15 and retains the part being contour formed in contact with the forming rolls under all conditions. For purposes of clarity, only the necessary mechanism is schematically illustrated in FIG. 13. However, it will be appreciated that the other mechanisms of the invention herein described are used in combination with the separation (distortion) preventing mechanism illustrated in FIGS. 13–15. In addition, it will be appreciated that minor mechanical modifications may be necessary in order for the schematically illustrated mechanism to be made compatible with the other mechanisms of the invention.

The distortion preventing mechanism illustrated in FIGS. 13–15 comprises two actuating brackets 211, one associated with each of the right and left hand forming rolls 55 and 59. Each bracket 211 includes two spaced arms 214. One end of each of the actuating brackets is connected by a universal joint mechanism 213 to a fixed support 215. The other ends of the actuating bracket arms 214 encircle essentially one-half of a sleeve 215 (FIG. 14), which surrounds the shaft 217 supporting the associated forming roll 55, one on either side thereof. An inverted U-shaped shoe mounting bracket 221 surrounds the forming roll 55 on the side diagonally opposed to the actuating bracket arms. The legs 219 of the shoe mounting bracket 221 include semi-circular apertures, which surround the other half of the sleeve 215 and are connected to the actuating arm 211 by bolts 223. The sleeve is rotatably mounted on the shaft 217, while the forming roll 55 is affixed thereto.

Bolts 229 attach an inwardly projecting shoe 231 to the cross-member of the shoe mounting bracket 221. The shoe 231, for a Z-section 233, is illustrated in FIG. 14. The illustrated shoe is L-shaped in cross-section and includes an inwardly projecting leg 235. The leg 235 has a side that is coplanar with the main portion of the Z-section and presses that portion against a cooperating surface of the forming roll 55. The tip of the inwardly projecting leg 235 lies in one outwardly projecting flange of the Z-section and the other leg of the shoe 231 presses against the other outwardly projecting flange of the Z-section. An edge plate 237 presses against the reverse flange of the outwardly projecting flange of the Z-section against which the tip of the leg 235 presses. In this manner, the shoe presses the Z-section against the forming roll 219, which includes corresponding surfaces, as is well known to those skilled in the art.

The cross-section of the shoe is formed so as to match the forming roll profile with an allowance for the material thickness of the section to be contour formed. Thus, the shoe 231 and the forming roll 55 define an orifice through which the part must pass. This orifice prevents the part from separating from the forming roll and distorting under bending loads. The part contacting surfaces of both the forming roll 55 and the shoe 231 are radiused longitudinally to the minimum expected part contour, as best shown in FIG. 15, so that only one portion of the shoe is tangent to the part. It is mandatory that the shoe rotate to track the tangent point between the part and the forming roll as the forming roll is traversed to produce the part. If this critical limitation is not met, a counterclockwise mislocation of the shoe-roll tangent point will tend to remove contour from the part being contour formed. Conversely, a clockwise mislocation will cause overcontouring of the part. The rotational attachment of the shoe mounting bracket and the actuating arm to the shaft via the sleeve surrounding the shaft and the universal joint allow the invention to meet this requirement.

As an alternative to the use of an articulated actuating arm to support a shoe mounting bracket, a programmable mechanical actuator could also be utilized by the invention to perform the functions illustrated in FIGS. 13–15 and described above.

In most circumstances, the only forming required of the N/C machine will be either uniplanar or multiplanar contour forming. In some circumstances, however, it may be desirable to change the relationship of one portion of the part being contour formed with respect to other portions. For example, it may be desirable to vary the angularity of the leg of a T-section while it is being contour formed. The invention provides a mechanism for accomplishing this result. That mechanism is illustrated in FIG. 16.

Figure 16:
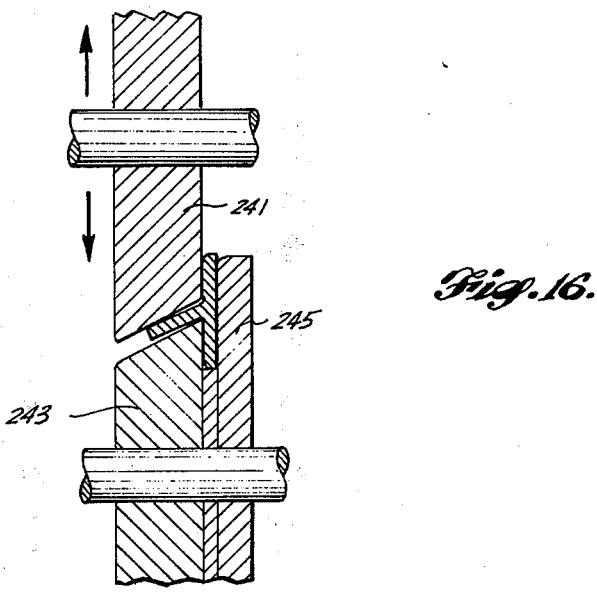
FIG. 16 is a cross-sectional view of a pair of pinch rolls that are adapted to changing the angularity of a leg of the part to be contour formed, as it is contour formed.

The mechanism for changing the leg angularity of a T-section illustrated in FIG. 16 comprises a pair of pinch rolls 241 and 243. The pinch rolls meet along a line that lies in a plane that intersects the rotational axes of the pinch rolls, as opposed to lying along a line that lies in a plane parallel to these axes. Controlling the position of one of the pinch rolls, for example the upper pinch roll, with respect to the other pinch roll, and causing the leg whose angularity is to be changed to pass between the two rolls allows the leg angularity change to be controlled. For example, if the pinch rolls are moved closer to one another, the leg angularity will be changed by a greater amount than it would be if they were separated by a larger amount. In addition to the upper and lower pinch rolls 241 and 243, a flange 245 which may or may not be rotational prevents the leg whose angularity is to be changed from moving out of the aperture formed between the upper and lower pinch rolls 241 and 243.

As noted above, the contour sensor 61 (FIG. 1) may be a multiplanar or a uniplanar contour sensor. Since a suitable multiplanar sensor is fully described in U.S. Pat. application Ser. No. 383,374, referenced above, and incorporated herein by reference, such a sensor will not be described in detail here. However, a suitable uniplanar sensor is hereinafter described.

Figure 17:
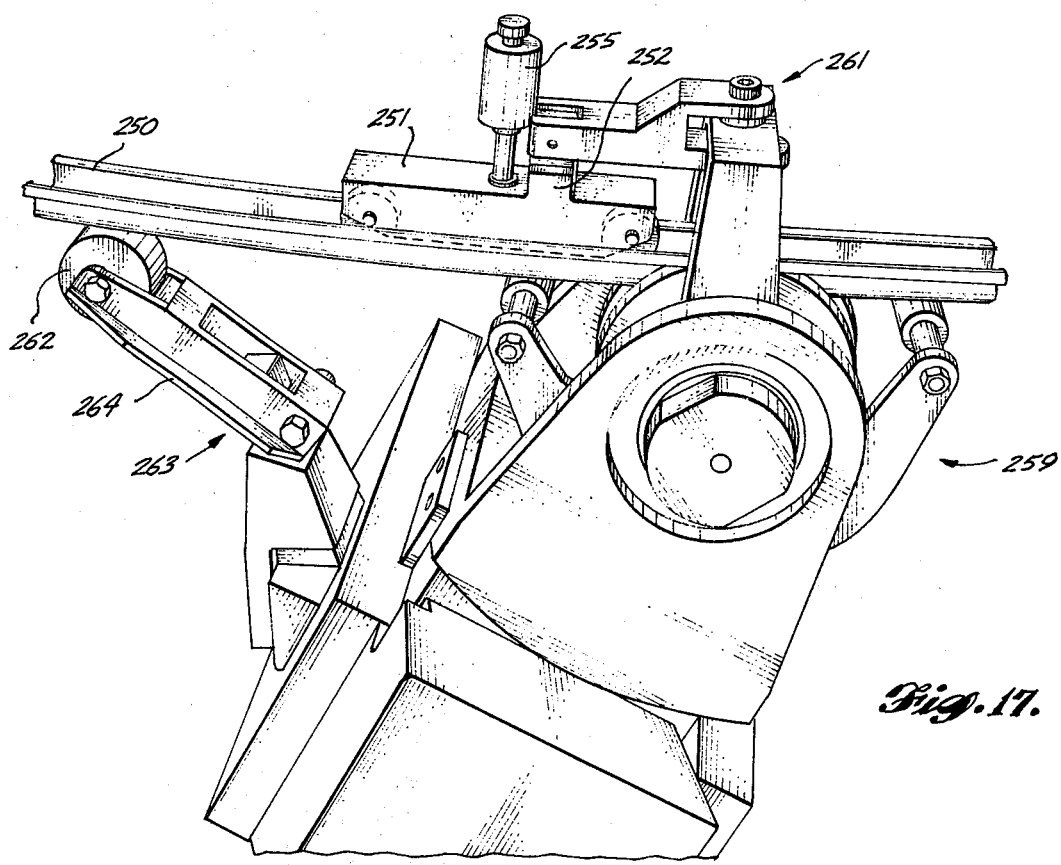
FIG. 17 is a perspective view of a uniplanar sensor, and the mechanism for supporting the sensor and the piece to be contour formed in the region of the sensor.
Figure 18:
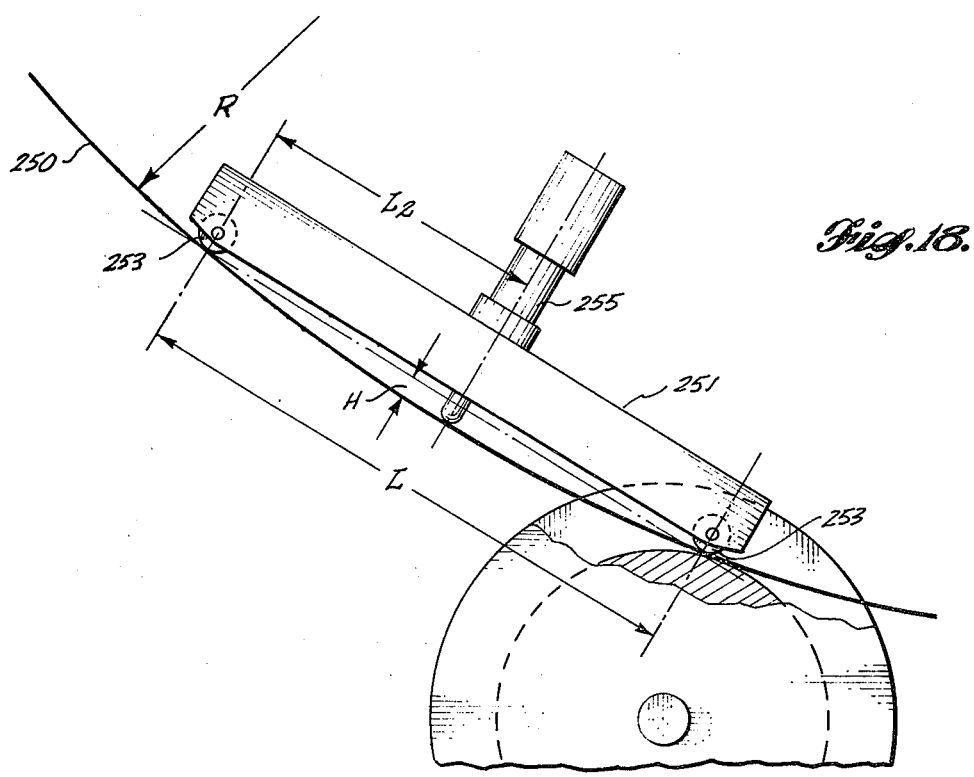
FIG. 18 is a schematic view illustrating the various dimensional relationships of a uniplanar sensor of the type illustrated in FIG. 17.
Figure 19:
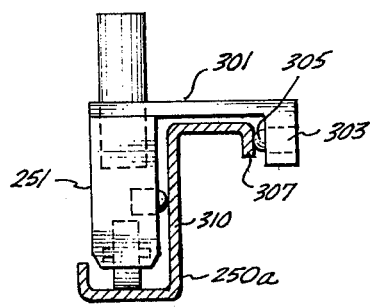
FIG. 19 is a cross-sectional view of a uniplanar sensor suitable for use when the part to be contour formed is Z-shaped in cross-section.
Figure 20:
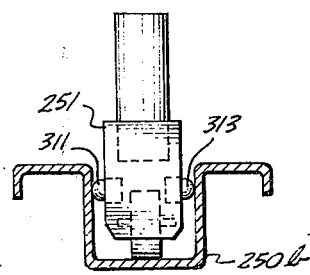
FIG. 20 is a cross-sectional view of a uniplanar sensor suitable for use when the part to be contour formed has a reverse flange hat cross-sectional configuration.
Figure 21:
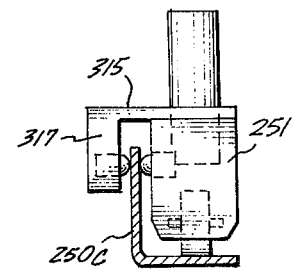
FIG. 21 is a cross-sectional view of a uniplanar sensor suitable for use when the piece to be contour formed has a right angle cross-sectional configuration.

FIGS. 17 and 18 illustrate a uniplanar sensor formed in accordance with the invention and FIGS. 19–21 illustrate cross-sectional configurations of such a sensor. These configurations are useful with parts of differing cross-sectional configurations to prevent the lateral movement of the sensor. The uniplanar sensor illustrated in the figures comprises an elongated sensor body 251 which may be formed of an aluminum bar machine to fit inside the section to be contour formed, as illustrated in FIGS. 19–21. A small roller 253 is attached to the lower corner of each end of the sensor body so that the body is free to ride on the part 250 without damaging the surface finish thereof. The rollers are separated by a predetermined span, 10 inches, for example, which establishes a chord length L. Mounted in the exact center of the sensor body is a linear variable differential transformer (LVDT) 255. The probe of the LVDT is located orthogonal to the cord length L and intersects the midpoint of the part immediately between the rollers. A suitable spring (not shown) forces the probe against the part and a suitable limiting mechanism prevents the probe from leaving the linear variable differential transformer when the sensor is not in use.

The signal from the linear variable differential transformer is related to part radius by the following equation:

$$R = \frac{4H^2 + L^2}{8H}$$

where:

H = the arc length of the chord joining the rollers;
L = the chord length; and,
R = the contour radius.

It is noted here that the span of the sensor body does not necessarily need to be 10 inches. A longer span will result in improved sensitivity; but, at a loss (increase) in transportation lag, and vice versa for an shorted span. In other words, there is a tradeoff between transportation lag and sensitivity.

FIG. 17 also illustrates a tangent point locating assembly 259 and a sensor support structure 261. Since these structures are similar to related structures illustrated and described in U.S. Pat. application Ser. No. 383,374, referenced above and incorporated herein by reference, they will not be discussed here, except to note that their inclusion is necessary to accurately locate the uniplanar sensor with respect to a reference point (tangent locating assembly 259) and to prevent the uniplanar sensor from unduly distorting the energizing part (sensor support structure 261). With respect to the sensor support structure, that structure is rotatably connected to the sensor body 251 via an inverted T-shaped arm 252 which may be contiguously formed with the sensor body. In addition to these mechanisms, FIG. 17 also illustrates a downstream part support mechanism 263. The downstream part support mechanism 263 comprises a roller 262 mounted on the end of an arm 264. The arm is located beyond the last (left) forming roll and is spring loaded so as to press the roller 262 against the lower surface of the part. Alternatively, the arm could be fixed in place. In any event, the downstream part support mechanism assists the sensor support structure in preventing the sensor weight from distorting the emerging part.

While the uniplanar sensor illustrated in FIGS. 17 and 18 provides an adequate indication of contour radius, it may provide a distorted output if it is not laterally positioned by a suitable mechanism. Such a mechanism is illustrated in FIGS. 19, 20 and 21 for parts having different cross-sectional configurations. In general, lateral positioning is accomplished by providing spring loaded pads that press against opposing surfaces of the part to be contour formed.

FIG. 19 illustrates a lateral positioning mechanism for a part 250a having a Z-shaped cross-section that comprises an arm 301 attached to the sensor body 251. The arm extends orthogonally outwardly from the sensor body and a downward projection 303. A first spring loaded aligning pad 305 is located in the downward projection 303 and presses against a return flange of the part 250a. A second spring loaded pad 309 extends outwardly from the sensor body 251 and presses against the main portion 310 of the part. Because the spring loaded pads press against the part in opposing directions, which directions lie orthogonal to the principal axis of the elongated sensor body, they maintain the sensor body in its lateral position.

FIG. 20 illustrates a lateral positioning mechanism suitable for use with a part having a return flange hat cross-sectional configuration. In this case, a pair of spring loaded pads 311 and 313 merely extend outwardly from opposite sides of the sensor body 251. Since the spring loaded pads project outwardly in opposite directions, they impinge on the opposing sides of the hat and maintain the sensor body laterally aligned.

FIG. 21 illustrates a lateral positioning mechanism suitable for use when the part to be contour formed is angle or L-shaped. In this mechanism, an arm 315 having a downward projection 317 extends orthogonally outwardly from the sensor body 251. The arm supports a first spring loaded pad 319 located on one side of the upward projecting flange of the angle. A second spring loaded pad 321 projects outwardly from the sensor body 251, on the opposite side of the upwardly projecting flange of the angle. The spring loaded press against the flange in opposite directions and, thus, maintain the sensor body laterally aligned. Obviously, other lateral positioning mechanisms can be used by the invention, depending upon the specific cross-sectional configuration of the part to be contour formed. Moreover, a series of arms (if needed) and aligned pairs of spring loaded pads can be located along the length of the sensor body, not just a single pair, if desired.

It will be appreciated from the foregoing description of a preferred embodiment that the invention provides a numerically controlled contour forming machine that includes a pair of numerically controlled forming rolls located on opposite sides of pinch rolls. Including the positioning of the pinch rolls, nine controlled axes suitable for roll forming three-dimensional part contours are provided. Either single or multiple passes may be made through the system to generate the desired contour.

With respect to multiple passes, this procedure is best performed, particularly for severe compound contours, by reversing directions using all four axes of each forming roll in alternating fashion. Thus, during the first pass in one direction, one forming roll assumes the position necessary to create a desired three-dimensional part pre-form, while the other forming roll remains in line with the pinch rolls. In the second pass, in the opposite direction, the first roll retraces its motion in a coordinated fashion with part travel (to avoid distorting the part), while the second roll creates a second part pre-formed. This back and forth sequence, with increasing roll offset at each pass, it continued until the final part configuration is achieved.

The invention increases the utility of roll forming machines by using them to create three dimensional contours. The end result is an improvement in the general operating efficiency and versatility of these machines. In this regard, in the past, forming rolls utilized in roll forming have usually only been manually adjustable along one (vertical) axis of motion. In some cases, one or two additional axes of motion, manually adjustable through a very limited range, may be provided to aid an operator in removing twist and bow from a part. While this arrangement has been suitable for producing parts contoured in a single plane, it has a variety of disadvantages, primarily the tedious manual adjustments required. The invention overcomes these difficulties. In addition, the invention greatly expands the capability of such machines.

In its most advanced configuration, the invention allows control over a multitude of axes. However, a lesser number of control axes can be utilized, if desired. Moreover, the invention has a variety of modes of operation. For example, manual inputs can be read into the machine and used to create simple uniplanar contours. In a slightly more advanced configuration, pre-created instructions in the form of a punched digital tape, magnetic cards, etc., can be utilized to generate instructions on an as-needed basis. Still further, in its adaptive control mode of operation, the general instructions are modified in accordance with part springback information before they are used to control forming roll position along the controllable axes. Hence, the invention is extremely versatile.

While not specifically noted above, obviously, the pinch rolls as well as the forming rolls can be hydraulically actuated using a regulated pressure level, for example. Normally, an adjustable travel stop is employed to set the gap between the pinch rolls making it equivalent to the thickness of the material to be contour formed. However, when it is desirable to run parts of varying thickness, the travel stop can be backed off, and the pressure system pressure reduced to the point where the force exerted on the material by the pinch rolls is insufficient to exceed the compressive strength of the material. This adjustment will cause the one pinch roll to track the thickness profile of the part as it is being formed. The compressive strength of the part material will be sufficient to force this roll away from the other roll when part thickness increases. But, the roll force must be adequate to restrain the part against the bending force applied by the forming roll to prevent inaccurate operation. Hydraulic actuation of the pinch rolls also allows the pinch rolls to be brought under closed loop control. Thus, pinch roll spacing can be placed under numerical control for positive control of the roll gap, which is of particular importance when rolling extremely soft materials. In addition, such a control can be used to vary leg angularity, as described above with respect to FIG. 16.

In addition to the features discussed above, preferably, the zero position of each axis can be moved anywhere throughout the range of movement along its axis. This result is accomplished by applying a biasing signal (floating zero input - FIG. 2) to the summing junction 100. The biasing signal merely raises or lowers the junction voltage to a level related to the desired zero position for the related axis. This feature and the ratio control signal feature may be used separately or in combination to empirically compensate for elastic recovery (springback) in the formed part. Such compensation is provided by overbending the part to a degree such that, when it relaxes after leaving the forming roll, it achieves the desired contour. In summary, thus, springback compensation is empirically accomplished in three general ways (zero bias, ratio control or both) depending on what type of empirical springback data is available for adding overbend allowances to the axis commands. Yet another way is to develop springback data in the form of charts, tables, graphs, etc. for each axis. This data should describe part contour parameters in terms of radii or twist angles. A data set should be developed for each material, thickness and part cross-section. This empirically developed data will allow individual axis commands to be modified during tape programming to include varying degrees of overbend according to the material and part configuration. The end result will be parts that are contour formed very close to the desired shape but lacking the precision possible through use of the adaptive control system.

In summary, if the part is being over contoured, the amount of overbend contained in the control signal source (e.g., magnetic tape) may be reduced by shifting the zero position of the axes or by adjusting the ratio control to a setting less than one so that a smaller axis offset is produced for a given command. Conversely, if the part is being overbent, either the axis zero position can be shifted or the ratio control setting increased to a factor larger than one so that greater axis offset results from a given axis command. Generally, the zero shift method is preferred when springback data is included in the program and the resulting part is close to the desired configuration. When springback data is not included in the tape program, a large correction factor (300–400 percent) may be required and the ratio control is best suited to accomplish the insertion of such a correction faction. Any deviation that still exists due to lot-to-lot variations in material properties is eliminated by the adaptive control signal modifying command signal. Thus, desired quality levels are maintained.

While a preferred embodiment of the invention has been illustrated and described, various changes can be made therein without departing from the spirit and scope of the invention. Some of these changes are briefly discussed above. In addition, it should be noted, that while linear variable differential transformers have been discussed as the type of detectors utilized by both the uniplanar and the multiplanar sensors, other types of position detectors can be used. For example, the position of a particular part may be measured in terms of XYZ coordinates using linear probes operating from fixed reference points, proximity detectors, light beams and the like. Hence, the invention can be practiced otherwise than as specifically described herein.

The embodiments of the invention in which exclusive property or privilege is claimed are defined as follows:

What is claimed is:

1. An N/C contour forming machine with adaptive control comprising:
   pinch rolls for moving a part to be contour formed through said N/C contour forming machine;
   at least one forming roll, said at least one forming roll position adjustable along at least one axis, the position of said at least one forming roll controlling the contour of a part as it is moved through said N/C contour forming machine by said pinch rolls;
   a contour sensor, said contour sensor sensing the contour of a part as it emerges from said N/C contour forming machine and generating at least one adaptive control signal related to said contour; and
   a control system, said control system: receiving numerical control signals suitable for controlling the position of said at least one forming roll along its at least one position adjustable axis; receiving said at least one adaptive control signal generated by said contour sensor; and, modifying said received numerical control signals by multiplying said received numerical control signals by a multiplication factor (k) determined in accordance with the following algorithm:

$$k = k_0 + \left[ \frac{q_0}{q_1} - 1 \right]$$

where:
   $k_0$ equals the preceding correction factor;
   $q_0$ equals a contour reference value related to the contour of the part being contour formed and computed from part geometry, said contour reference value forming a portion of said received numerical control signals; and
   $q_1$ equals the contour sensed by the contour sensor.

2. An N/C contour forming machine with adaptive control as claimed in claim 1 wherein:
   said at least one forming roll is position adjustable along a plurality of axes; and,
   said control system receives numerical control signals suitable for controlling the position of said at least one forming roll along each of its plurality of position adjustable axes, and modifies said received numerical control signals by multiplying said received numerical control signals by multiplication factors ($k$) determined for each axis in accordance with the algorithm:

$$k = k_0 + \left[ \frac{q_0}{q_1} - 1 \right]$$

where:
   $k_0$ equals the preceding correction factor for the related axis;
   $q_0$ equals a contour reference value for the related axis and computed from part geometry, said contour reference value forming a portion of the received numerical control signals; and,
   $q_1$ equals the contour sensed by the contour sensor and related to the related axis whose multiplication factor is being determined.

3. An N/C contour forming machine with adaptive control as claimed in claim 2 wherein:
   said at least one forming roll forms a left hand forming roll;

said N/C contour forming machine also includes a right hand forming roll that is position adjustable along a plurality of axes, the position of said right hand forming roll assisting said left hand forming roll in controlling the contour of a part as it is moved through said N/C contour forming machine by said pinch rolls; and, said control system receives numerical control signals for controlling the position of said right hand forming roll along its plurality of position adjustable axes and modifies said received numerical control signals by multiplying said received numerical control signals related to said right hand forming roll by multiplication factors ($k$) determined for each axis in accordance with the algorithm:

$$k = k_0 + \left[ \frac{q_0}{q_1} - 1 \right]$$

where:
$k_0$ equals the preceding correction factor for the related axis;
$q_0$ equals a contour reference value for the related axis computed from part geometry, said contour reference value forming a portion of the received numerical control signals; and,
$q_1$ equals the contour sensed by the contour sensor and related to the related axis whose multiplication factor is being determined.

4. An N/C contour forming machine with adaptive control as claimed in claim 3 wherein:
the axis along which the part centerline moves when the right and left hand forming rolls are in line with the pinch rolls is defined as the X-axis;
the left hand forming roll is position adjustable along Y, Z, $a$ and $b$ axes defined as:
Y-axis -- movement of the left hand forming roll along a line transverse to the X-axis;
Z-axis -- lateral movement of the left hand forming roll with respect to the pinch rolls;
$a$-axis -- rotation of the left hand forming roll about the part centerline; and,
$b$-axis -- rotation of the left hand forming roll about the Y-axis; and,
the right hand roll is position adjustable along V, W, d and e axes, said axes defined as:
V-axis -- movement of the right hand forming roll along a line transverse to the X-axis;
W-axis -- lateral movement of the right hand forming roll with respect to the pinch rolls;
$d$-axis -- rotation of the right hand forming roll about the part centerline; and,
$e$-axis -- rotation of the right hand forming roll about the V-axis.

5. An N/C contour forming machine with adaptive control as claimed in claim 4 wherein the position of said left hand forming roll along at least one of said Y, Z, a and b axes is controllable and wherein the position of said right hand forming roll along at least one of said V, W, d and e axes is controllable.

6. An N/C contour forming machine with adaptive control as claimed in claim 5 including:
first power means for controlling the position of said left hand forming roll along its at least one controllable axis; and,
second power means for controlling the position of said right hand forming roll along its at least one controllable axis.

7. An N/C contour forming machine with adaptive control as claimed in claim 6 wherein said control system includes:
a rate sensor for sensing the rate of rotation of the pinch rolls and generating a rate signal in accordance therewith;
an axis rate control for receiving said rate signal and a feed rate signal and generating axis rate signals, one related to each controllable axis, in accordance therewith, said feed rate signal forming a portion of said numerical control signals;
an axis position command circuit for each controllable axis of said right and left hand forming rolls, each of said axis position command circuits connected to receive its related axis rate signals generated by said axis rate control and axis position control signals relating to the desired position of the related forming roll along the related axis and generate an axis position command for the related axis in accordance therewith, said axis position control signals forming a portion of said numerical control signals; and,
an axis position control circuit for each uncontrollable axis of said right and left and forming rolls, each of said axis position control circuits connected to receive its related axis command signal generated by its related axis position command circuit and modify said axis command signal by multiplying it by the multiplication factor ($k$) related to the related axis and applying the result to the related power means of said first and second power means.

8. An N/C contour forming machine with adaptive control as claimed in claim 7 wherein each of said axis position controls includes a servo loop, said servo loops including signal generating means adapted to generate an output signal related to the position of the related forming roll along the related axis.

9. An N/C contour forming machine with adaptive control as claimed in claim 8 wherein each of said axis position command circuits includes a position memory having an output related to the position of the related forming roll along the related axis, a comparator for comparing the output of said position memory with the axis position command related to the related axis and generating output signals when an unequal comparison occurs, said output signals causing said position memory to be searched until a comparison occurs.

10. An N/C contour forming machine with adaptive control as claimed in claim 9 wherein each of said right and left hand forming rolls is position adjustable by a mechanism comprising:
a yoke having a semi-spherical outer surface, the related forming roll being mounted in said yoke; and,
an orthogonal positioning mechanism supporting its associated yoke in a manner such that said yoke is free to move about said spherical surface along said a or d axis of the related part, said orthogonal positioning mechanism adapted to position said yoke along the Y/Z axes or V/W axes of the related forming roll.

11. An N/C contour forming machine with adaptive control as claimed in claim 10 wherein said movement of said yokes with respect to said orthogonal positioning mechanism and said movement of said orthogonal positioning mechanism along their two orthogonal axes is powered by the related power means of said first and second power means.

12. An N/C contour forming machine with adaptive control as claimed in claim 11 wherein all powered movement relating to said yokes and said orthogonal positioning mechanism is created by hydraulic actuators.

13. An N/C contour forming machine with adaptive control as claimed in claim 12 including a shoe associated with each forming roll, said shoes mounted so as to be tangent to their associated forming rolls and create an orifice through which the part to be contour formed is adapted to pass.

14. An N/C contour forming machine with adaptive control as claimed in claim 13 wherein said sensor is a multiplanar sensor.

15. An N/C contour forming machine with adaptive control as claimed in claim 13 wherein said sensor is a uniplanar sensor.

16. An N/C contour forming machine with adaptive control as claimed in claim 15 wherein said uniplanar sensor includes lateral positioning means for preventing the lateral movement of said sensor with respect to the part being contour formed.

17. An N/C contour forming machine with adaptive control as claimed in claim 4 wherein said pinch rolls are position adjustable along an axis transverse to said X-axis; and including means for position adjusting said pinch rolls along said axis transverse to said X-axis.

* * * * *

UNITED STATES PATENT AND TRADEMARK OFFICE
CERTIFICATE OF CORRECTION

PATENT NO. : 3,906,765
DATED : September 23, 1975
INVENTOR(S) : Gene B. Foster

It is certified that error appears in the above-identified patent and that said Letters Patent are hereby corrected as shown below:

Column 7, line 11, through Column 7, line 52, delete "manner such that . . . converter 89. The".

Column 23, line 37, after the word "axes" insert --, said axes--.

Column 24, lines 26-27, delete "uncontrollable" and insert therefor --controllable--.

*Signed and Sealed this*

Twenty-first *Day of* June 1977

[SEAL]

*Attest:*

RUTH C. MASON
*Attesting Officer*

C. MARSHALL DANN
*Commissioner of Patents and Trademarks*